(12) United States Patent
Ushiku

(10) Patent No.: US 8,418,169 B2
(45) Date of Patent: Apr. 9, 2013

(54) MANAGEMENT METHOD FOR MANAGING SOFTWARE MODULE AND INFORMATION PROCESSOR

(75) Inventor: Toyohiko Ushiku, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1337 days.

(21) Appl. No.: 11/297,029

(22) Filed: Dec. 7, 2005

(65) Prior Publication Data

US 2006/0122962 A1 Jun. 8, 2006

(30) Foreign Application Priority Data

Dec. 7, 2004 (JP) ................. 2004-354696

(51) Int. Cl.
*G06F 9/44* (2006.01)
*G06F 9/445* (2006.01)
*G06F 9/455* (2006.01)
*G06F 9/46* (2006.01)
*G06F 9/00* (2006.01)
*G06F 12/00* (2006.01)
*G06F 12/14* (2006.01)
*G06F 13/00* (2006.01)
*G06F 17/30* (2006.01)
*G06F 15/173* (2006.01)
*G06F 15/16* (2006.01)

(52) U.S. Cl. ............ 717/174; 717/175; 717/120; 718/1; 718/100; 718/104; 726/17; 709/223; 709/224; 709/226; 709/229

(58) Field of Classification Search .......... 717/101, 717/105, 104, 120, 174, 175, 176, 177, 178; 706/46; 709/226, 229; 726/17
See application file for complete search history.

(56) References Cited

U.S. PATENT DOCUMENTS

| | | | | |
|---|---|---|---|---|
| 5,764,889 | A * | 6/1998 | Ault et al. ........................ | 726/17 |
| 6,067,559 | A | 5/2000 | Allard et al. | |
| 6,098,111 | A * | 8/2000 | Maegawa et al. ............. | 719/310 |
| 6,349,408 | B1 * | 2/2002 | Smith ........................... | 717/174 |
| 6,557,168 | B1 * | 4/2003 | Czajkowski .................. | 717/151 |
| 6,567,974 | B1 * | 5/2003 | Czajkowski .................. | 717/151 |
| 6,571,389 | B1 * | 5/2003 | Spyker et al. ................ | 717/176 |
| 6,622,155 | B1 * | 9/2003 | Haddon et al. ................ | 718/100 |

(Continued)

FOREIGN PATENT DOCUMENTS

CN 1271893 11/2000
GB 2318435 4/1998

(Continued)

OTHER PUBLICATIONS

Hall et al, "An OGSi Implementation and Experience Report", Jan. 2004, IEEE publishings.*

(Continued)

*Primary Examiner* — Emerson Puente
*Assistant Examiner* — Charles Swift
(74) *Attorney, Agent, or Firm* — Cowan, Liebowitz & Latman, P.C.

(57) ABSTRACT

An attribute of a software module is referred to upon activating the software module and the software module is activated so that it is executed on a process separately generated, in a case where the referred attribute include a different process generation attribute indicating that the software module is to be executed on a process different from an installed process.

15 Claims, 10 Drawing Sheets

U.S. PATENT DOCUMENTS

| | | | |
|---|---|---|---|
| 6,865,735 B1* | 3/2005 | Sirer et al. | 717/158 |
| 7,200,800 B2* | 4/2007 | St. Clair | 714/799 |
| 7,203,944 B1* | 4/2007 | van Rietschote et al. | 718/104 |
| 7,231,642 B2* | 6/2007 | Araki et al. | 719/320 |
| 7,337,436 B2* | 2/2008 | Chu et al. | 717/140 |
| 7,401,230 B2* | 7/2008 | Campbell et al. | 713/190 |
| 7,409,487 B1* | 8/2008 | Chen et al. | 711/6 |
| 7,424,722 B2* | 9/2008 | Joseph | 719/330 |
| 7,437,432 B2* | 10/2008 | Bodin et al. | 709/220 |
| 7,519,964 B1* | 4/2009 | Islam et al. | 717/177 |
| 7,640,290 B2* | 12/2009 | Hayes, Jr. | 709/200 |
| 7,716,663 B2* | 5/2010 | Hayes, Jr. | 717/174 |
| 7,908,653 B2* | 3/2011 | Brickell et al. | 726/22 |
| 2003/0046681 A1* | 3/2003 | Barturen et al. | 717/177 |
| 2003/0115178 A1* | 6/2003 | Doole et al. | 707/1 |
| 2003/0149967 A1* | 8/2003 | Kamada et al. | 717/148 |
| 2003/0191823 A1* | 10/2003 | Bansal et al. | 709/220 |
| 2004/0123289 A1* | 6/2004 | Drews | 718/1 |
| 2004/0139177 A1* | 7/2004 | Yook | 709/220 |
| 2004/0158624 A1* | 8/2004 | Bodin et al. | 709/222 |
| 2004/0181775 A1* | 9/2004 | Anonsen et al. | 717/104 |
| 2004/0194059 A1* | 9/2004 | Akella et al. | 717/118 |
| 2004/0220893 A1* | 11/2004 | Spivack et al. | 706/46 |
| 2004/0221256 A1* | 11/2004 | Martin et al. | 717/101 |
| 2004/0226001 A1* | 11/2004 | Teegan et al. | 717/120 |
| 2004/0230944 A1* | 11/2004 | Murphy et al. | 717/105 |
| 2004/0267950 A1* | 12/2004 | Praefcke et al. | 709/231 |
| 2005/0198303 A1* | 9/2005 | Knauerhase et al. | 709/227 |
| 2005/0223362 A1* | 10/2005 | Whitlock et al. | 717/126 |
| 2006/0122962 A1* | 6/2006 | Ushiku | 707/1 |
| 2007/0169024 A1* | 7/2007 | Drepper | 717/139 |

FOREIGN PATENT DOCUMENTS

| | | |
|---|---|---|
| JP | 09-245003 A | 9/1997 |
| JP | 2004-318459 A | 11/2004 |
| WO | 02/075538 A | 9/2002 |

OTHER PUBLICATIONS

Deubler et al, "Sound Development of Secure Service-based Systems", Nov. 2004, ACM Publishings.*

Chinese Office Action dated May 25, 2007 for counterpart Chinese patent application No. 2005101277934 (with English translation).

OSGi Service Platform Specification Release 2, OSGi, 2001, pp. 24-28 and 45-46.

Microsoft Technet: "IIS 5.0 Resource Guide—Chapter 6—Developing Web Applications" Microsoft Technet, [Online] Sep. 21, 2007, pp. 1-36.

European Search Report Oct. 10, 2007.

* cited by examiner

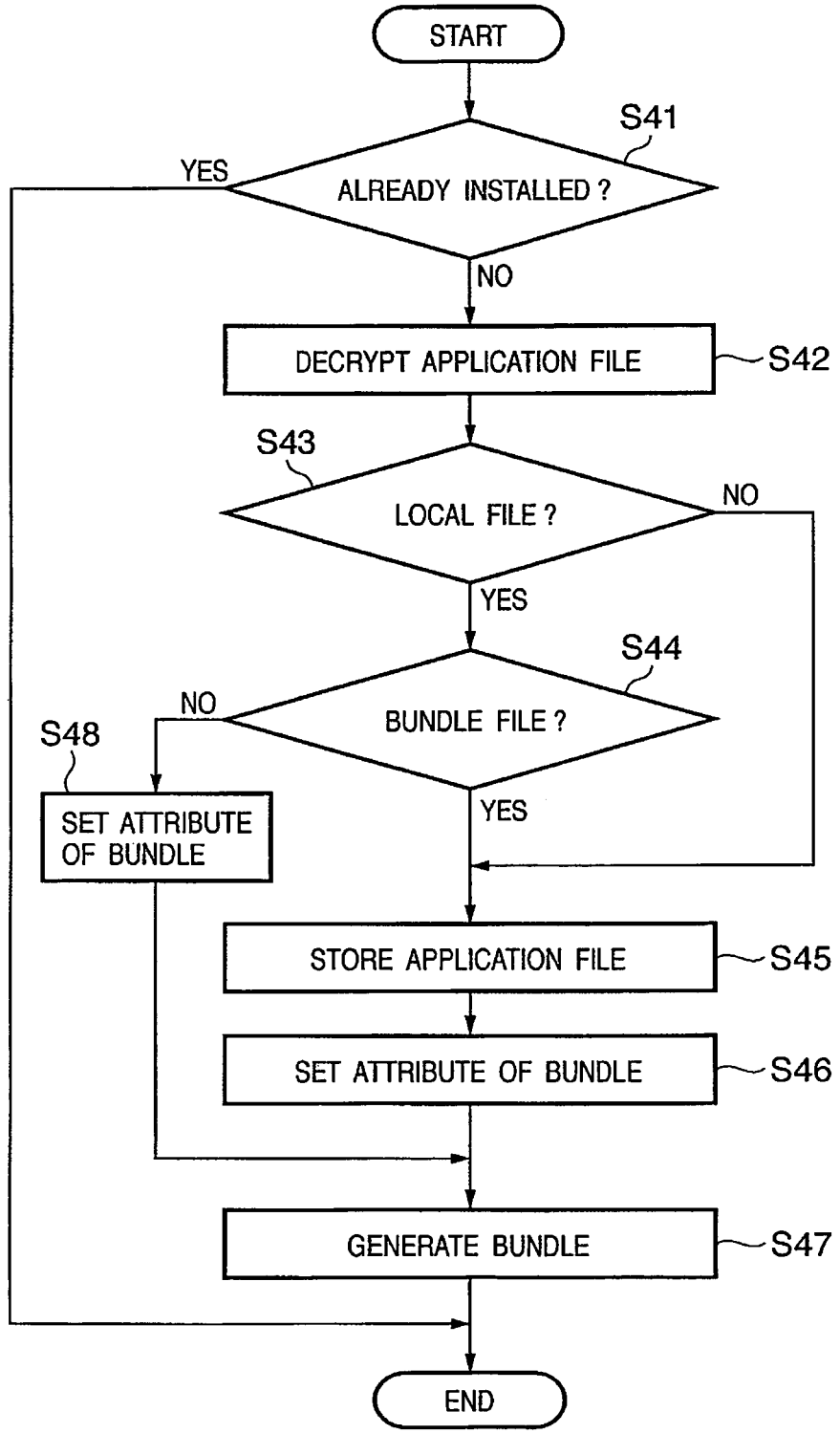

MANAGEMENT METHOD FOR MANAGING SOFTWARE MODULE AND INFORMATION PROCESSOR

FIELD OF THE INVENTION

The present invention relates to an information processor provided with an application constituted by multiple software modules and a method therefor.

BACKGROUND OF THE INVENTION

Java (Java is a software technique including a programming language and is a registered trademark of Sun Microsystems Inc. in U.S.) has program portability, and there is proposed a technique for utilizing the portability to provide an extendable application (U.S. Pat. No. 6,349,408 and OSGi Service Platform Specification Release 2, OSGi, 2001). According to this technique, programs are executed on one application, and therefore, the required number of hardware resources is reduced in comparison with the case of extending functions in unit of an application.

In OSGi Service Platform (hereinafter abbreviated as OSGi), a software module to be added to an application is referred to as a bundle, and specifications are defined for managing the life cycle of a software module, for example, installation/activation/termination/update/uninstallation of a bundle. Furthermore, OSGi is also provided with a function of storing the condition of each bundle being executed when the application stops, and returning the status of each bundle to the status at the time of the stop when the application is re-activated.

Conventionally, software modules have been treated as one application from the viewpoint of an operating system managing softwares. Therefore, a software separation/execution function (a function of executing software in a different space as a process), which is originally provided for the operating system, cannot be used in order to prevent a trouble of one software module from affecting other software modules. Consequently, there is a high possibility that a software module with a high possibility of causing a trouble because of performing advanced processing causes a trouble which leads the entire application into malfunction.

Since hardware resources of equipment have been abundant, it is possible to introduce a more enhanced operating system into equipment to execute multiple applications at the same time. Accordingly, it is possible to solve problems by executing additional functions as separate applications (processes).

However, a procedure for extending functions of one application and a procedure for extending functions as a separate application are different from each other. Therefore, there are multiple procedures for the purpose of managing the life cycle of the same extended function. Furthermore, in the case of adding a function only by adding an application, there is a problem that a user may be confused by change in the operation method. Furthermore, there is also a problem that a software module for functional extension, which has been purchased or developed, may not be used at all, and inheritance of software assets is sacrificed.

SUMMARY OF THE INVENTION

The present invention has been made in consideration of the above problems, and the feature of the present invention is to provide an apparatus capable of executing a specified application as a different process in a framework in which multiple applications can be executed on one process, and a method therefor.

An information processing method according to an aspect of the present invention is provided with the following steps. That is, a management method for managing software modules, comprising the steps of:

referring to an attribute of a software module when activating the software module; and activating the software module in a manner that it is executed on a process separately generated, in a case where the attribute referred in the reference step include a different process generation attribute indicating that the software module is to be executed on a process different from an installed process.

An information processor according to an aspect of the present invention has the following configuration. That is, there are provided:

reference means for referring to attribute of a software module when activating the software module; and activation means for activating the software module in a manner that it is executed on a process separately generated, in a case where the attribute referred by the reference means include a different process generation attribute indicating that the software module is to be executed on a process different from an installed process.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a flowchart illustrating installation processing according to a second embodiment of the present invention.

DETAILED DESCRIPTION OF THE PREFERRED EMBODIMENTS

Preferred embodiments of the present invention will now be described in detail with reference to the accompanying drawings. It should be noted that the embodiments that follow do not limit the invention set forth in the claims and that all combinations of features described in the embodiments are not necessarily essential as means for attaining the invention.

First Embodiment

Figure 1:
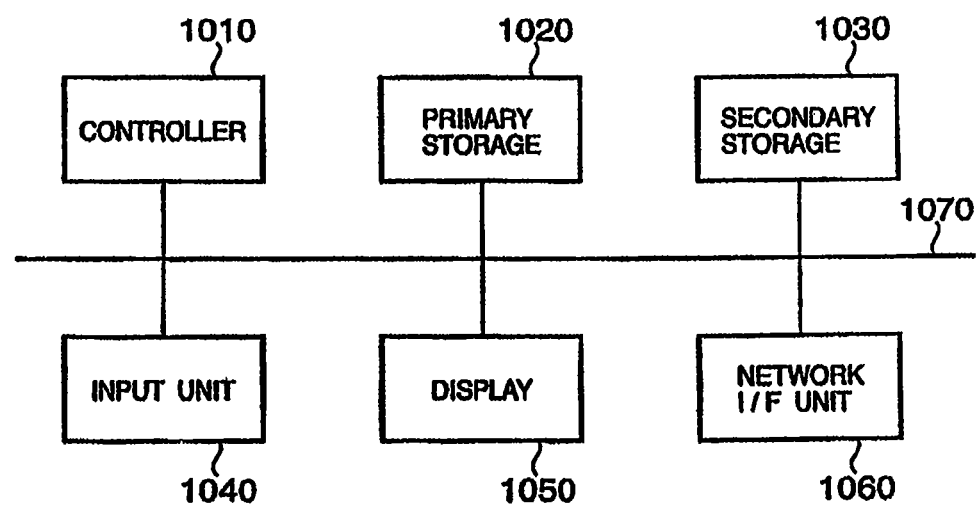
FIG. 1 is a block diagram showing configuration of computer equipment according to an embodiment of the present invention.

FIG. 1 is a block diagram showing configuration of well known computer equipment and the computer equipment is an information processor such as a PC or a workstation. The configuration can be applicable to a configuration of a computer equipment according to an embodiment of the present invention.

In the figure, a controller 1010 has a CPU to control the operation of the entire equipment. A primary storage unit 1020 is a storage for temporarily storing various data or software to be executed by the controller 1010 (for example, software indicated by flowcharts in FIGS. 3, 6, 8 and 9 to be described later) and is configured by a RAM or the like. A secondary storage unit 1030 is a storage for permanently storing various data or software to be executed by the controller 1010 and is configured by a hard disk, for example. An input unit 1040 has a keyboard, a mouse (a pointing device), a touch screen, a scanner and the like for inputting a user instruction, character data or image data. A display 1050 has a display panel such as a liquid crystal panel for displaying an instruction to an operator, content of data and the like. A network interface unit 1060 performs communication with other equipment via a network such as a LAN. A bus 1070 is a system bus for connecting the above-described units and exchanging data and control signals among the units.

Figure 2:
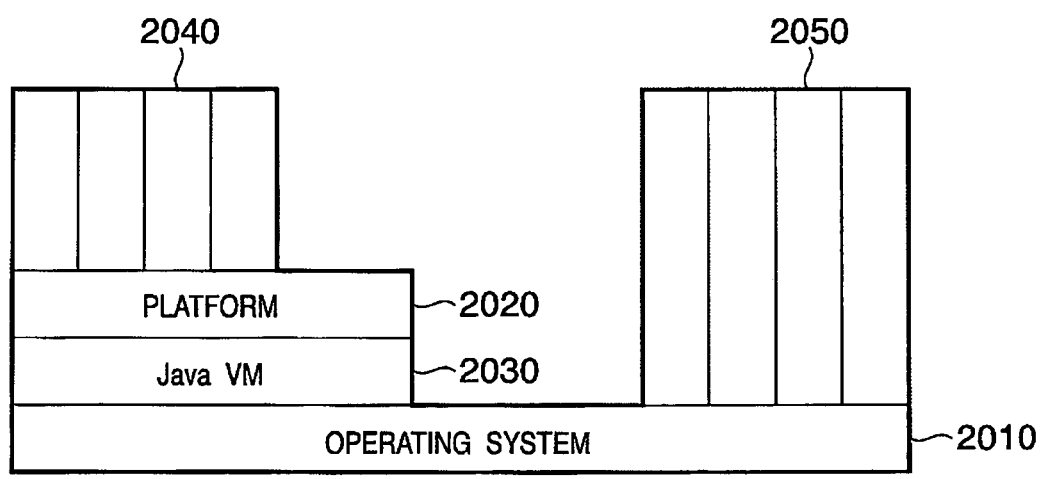
FIG. 2 depicts a configuration of software to be executed by the control section of the computer equipment according to this embodiment, with the use of hierarchies.

FIG. 2 depicts a configuration of software to be executed by the controller 1010 of the computer equipment according to this embodiment with the use of hierarchies.

In FIG. 2, an operating system (OS) 2010 manages application software and hardware resources, and various software is executed on this OS 2010. Reference numeral 2020 denotes a platform in which the specifications of OSGi Service Platform, an application written in the Java language and capable of extending a software module, is implemented. A Java VM (a virtual machine for interpreting and executing the Java language) 2030 is a virtual machine dedicated for Java programs, which is for executing the platform 2020. Reference numeral 2040 denotes a group of bundles, which are software modules (hereinafter referred to as bundles) written in the Java language and which are to be executed on the platform 2020. Reference numeral 2050 denotes a group of other applications to operate on the operating system 2010. The Java VM 2030 is treated quite the same as applications belonging to the group of other applications 2050, by the operating system 2010.

Figure 3:
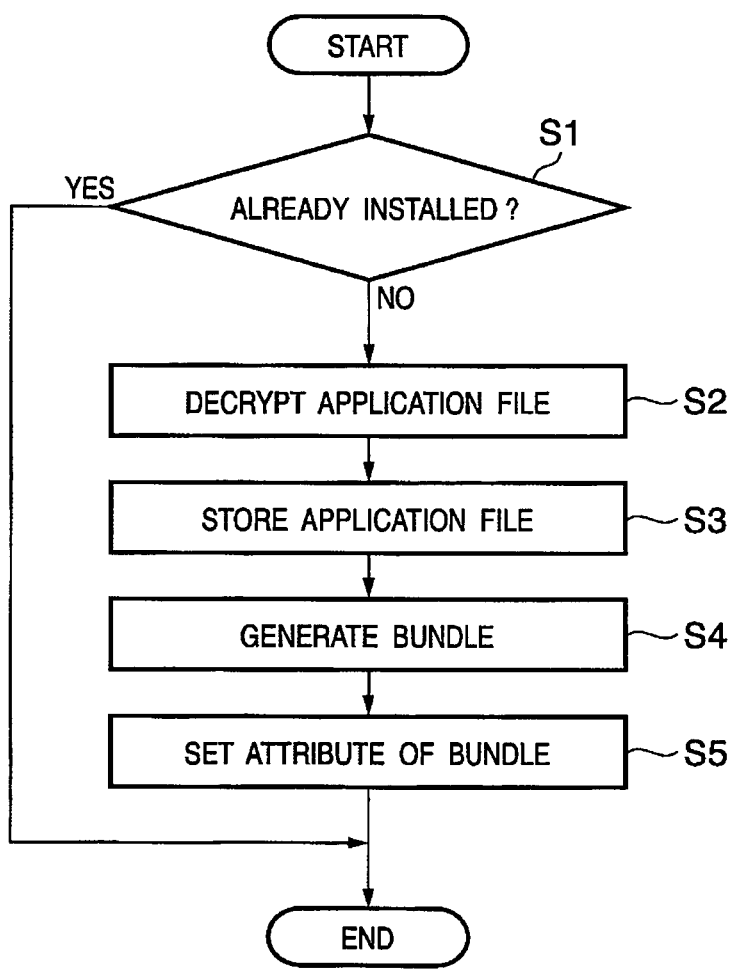
FIG. 3 is a flowchart illustrating processing to be performed when a bundle is installed in the computer equipment according to this embodiment.

FIG. 3 is a flowchart illustrating processing to be performed when a bundle 2040 is installed in the computer equipment according to this embodiment.

Figure 4:
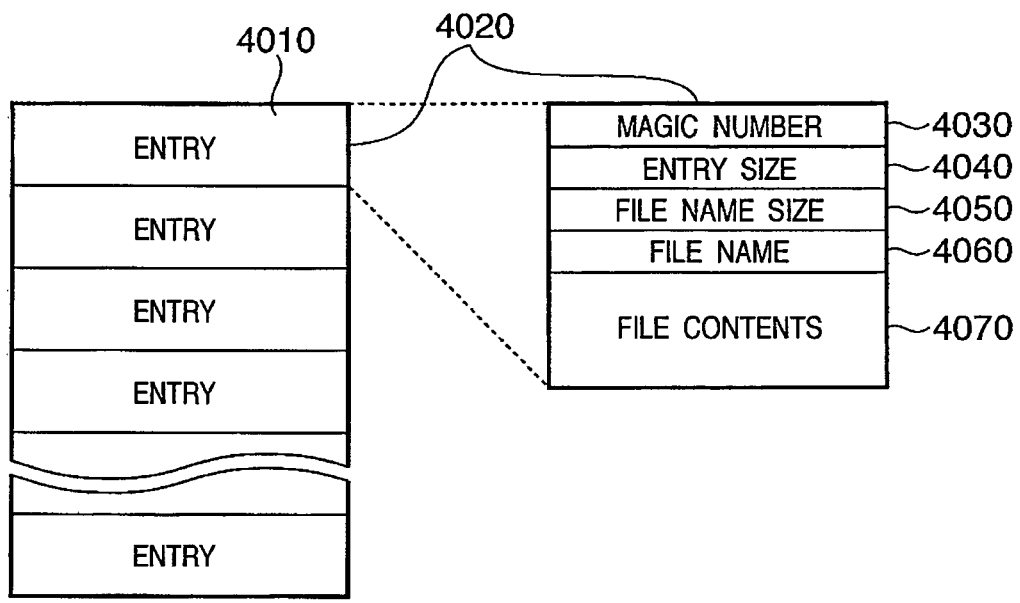
FIG. 4A depicts a form when a bundle file to be installed is not encrypted.
FIG. 4B depicts an example of a manifest in which attributes of a Jar file are described.

FIG. 4A depicts a form when a bundle file to be installed is not encrypted, and FIG. 4B depicts an example of a manifest in which attributes of a Jar file are described.

A bundle file 4010 is in the Jar file format of the Java language. This Jar file is a ZIP archive file and is configured by columns of multiple file entries 4020. Each file entry 4020 has fields indicating a magic number 4030 indicating the start of the file entry, a file entry size 4040, a file name size 4050, a file name 4060 and file contents 4070. In FIG. 4A, the specifications of a ZIP file are simplified and shown in order to simplify the description.

Various attributes of this Jar file are called a manifest and stored in the file entry. The file name of this manifest is "META-INF/MANIFEST.MF" as shown in FIG. 4B. In this manifest, there are described attribute names and attribute values paired with the attribute names.

In FIG. 4B, "Bundle-Activator" defines the name of a class of Java to be activated first after installation. "Bundle-Classpath" indicates the search order of Jar files to search for the class. "NeedProcess" indicates that execution of this bundle is to be performed by a different process. "Import-Package" defines a package exported from a different bundle when the package is used. "Import-Service" indicates that a part of functions of a different bundle is provided for other bundles.

Next, processing for installing the bundle 2040 in the computer equipment according to this embodiment, will be explained with reference to the flowchart in FIG. 3.

First, at step S1, it is determined whether a bundle installed from the same location where a file specified to be installed is stored exists or not, that is, whether the bundle file has already been installed. If it exists, then the processing is terminated. Otherwise, the procedure proceeds to step S2. At step S2, the bundle file is installed in the platform 2020, and the installed, encrypted bundle file 4010 is decrypted. The encryption key used for the decryption is managed by the platform 2020 as a private key.

Next, at step S3, the bundle file 4010 decrypted at step S2 is stored in a directory for managing bundles. Next, at step S4, a bundle management object for managing bundles on the platform 2020 is generated.

Figure 5:
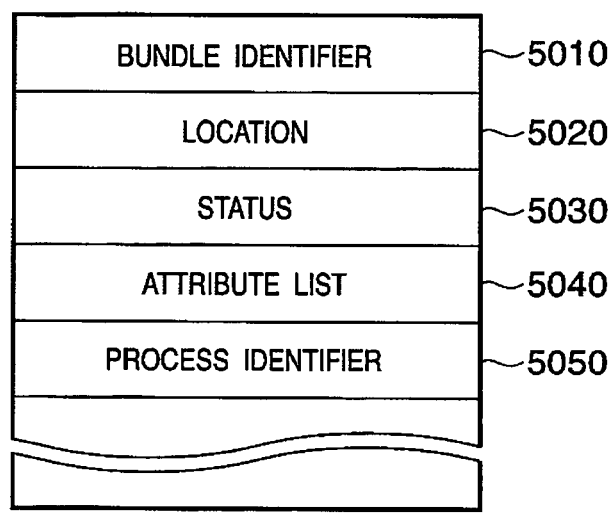
FIG. 5 depicts the structure of a bundle management object according to this embodiment.

FIG. 5 depicts the structure of the bundle management object according to this embodiment.

In the figure, a bundle identifier 5010 is an identifier for identifying each bundle. A location 5020 is information showing where the bundle was installed from and indicated by a URL. A status 5030 describes the status of this bundle. For example, "INSTALLED" is set if the bundle is installed, and "ACTIVE" is set during execution of the bundle. An attribute list 5040 describes attributes of this bundle. That is, the attributes described in the manifest file shown in FIG. 4B are stored. A process identifier 5050 is an identifier given when this bundle is executed as a different process. The different process means that a software module is to be executed on a process different from a process in which the application on which the software module has been installed is being executed.

Then, the procedure proceeds to step S5 in FIG. 3, and the attributes described in the manifest in the bundle file 4010 are set in the attribute list 5040 of the bundle management object generated at step S4, as a hash table instance. All the attribute names are registered with the hash table instance so that search can be performed with the attribute names as keys. In this case, a status value ("INSTALLED"), which indicates that the bundle has been installed, is set for the status 5030 of the bundle management object.

Through the above-described processing, the bundle 2040 is installed. Here, the installation processing for a bundle to be executed as a different process and that for a bundle to be executed on the platform 2020 are different only in the following point. That is, both bundles are different from each other only in whether or not they have the "NeedProcess" attribute for specifying that execution is to be performed on a different process.

Figure 6:
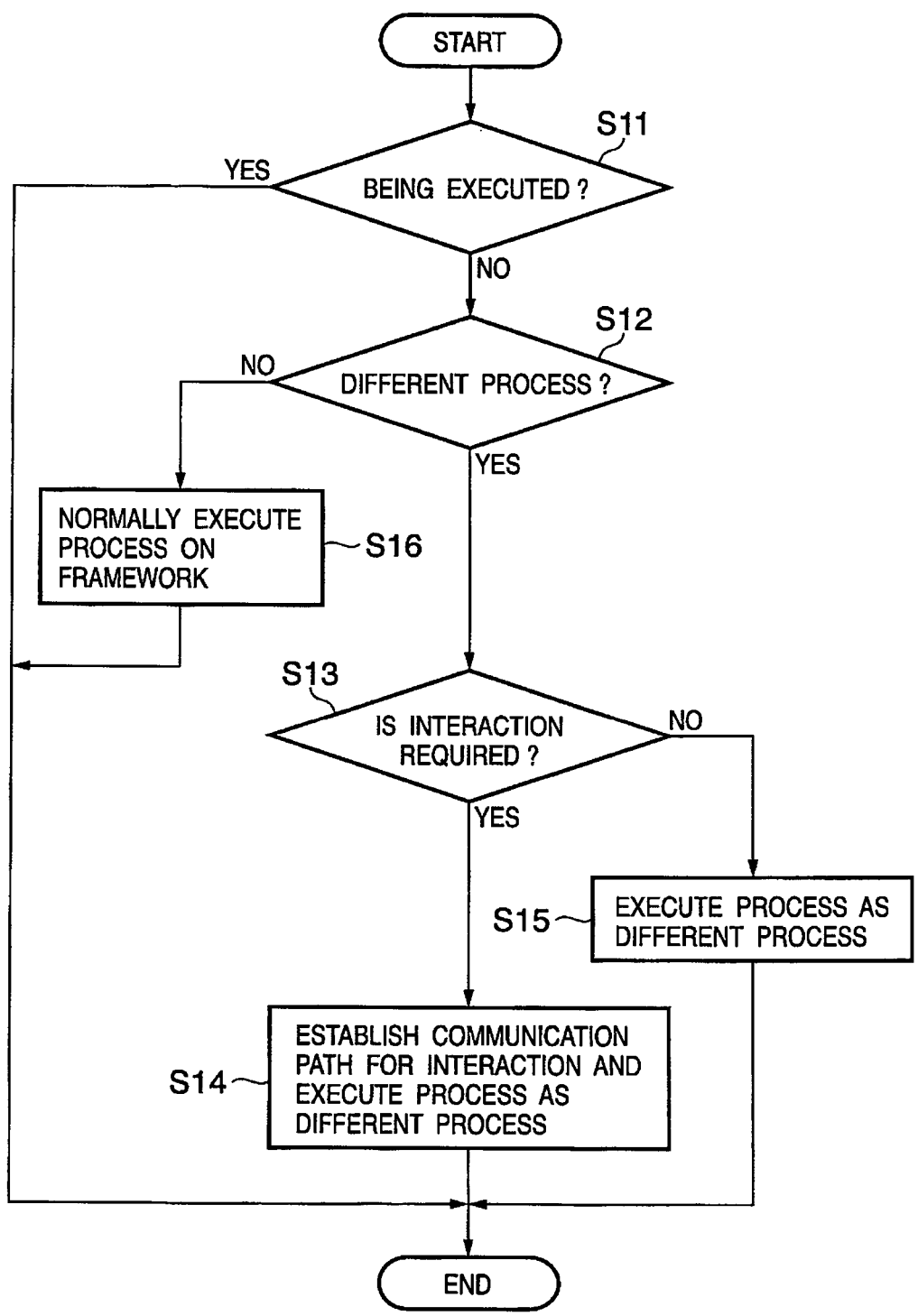
FIG. 6 is a flowchart illustrating bundle activation processing in the computer equipment according to this embodiment.

FIG. 6 is a flowchart illustrating bundle activation processing in the computer equipment according to this embodiment.

First, at step S11, it is determined whether the status 5030 of the bundle management object of a specified bundle is "ACTIVE" (during execution). If the status 5030 is "ACTIVE", the bundle has already been executed, and therefore the processing is terminated. If the status 5030 is not "ACTIVE", then the procedure proceeds to step S12, and it is determined whether "NeedProcess" which instructs execution to be performed in as different process is set in the attribute list 5040 of the bundle management object. Here, since the attribute list 5040 is configured as the hash table instance, a "NeedProcess" attribute value can be obtained by specifying the name of the "NeedProcess" attribute as a key. If the "NeedProcess" attribute which indicates that execution is to be performed on a different process is set, the procedure proceeds to step S13. Otherwise, the procedure proceeds to step S16.

At step S16, since the bundle to be activated is a normal bundle on the platform 2020, activation processing for a bundle on the platform 2020 is performed. When the activation processing is completed, the status value "ACTIVE" which indicates that execution is being performed is set for the status 5030 of the bundle management object. The process identifier of the platform 2020 itself is set as the process identifier 5050 of the bundle management object.

In the case of performing execution as different process, at step S13, the platform 2020 checks the "NeedProcess" attribute value obtained at step S12 and determines whether interactive operation is required between the bundle to be activated and the platform 2020. For a bundle requiring interactive operation, "Interactive" must be defined as the "NeedProcess" attribute value. Therefore, if what is specified as the "NeedProcess" attribute is anything other than "Interactive", then the platform 2020 recognizes that the interactive operation is not required and proceeds to step S15, where the bundle is activated as a different process. The details will be described with reference to FIG. 7.

On the other hand, if it is determined at step S13 that the interactive operation is required, then the procedure proceeds to step S14, where a communication path for interaction is formed and the bundle is activated as a different process.

Figure 7:
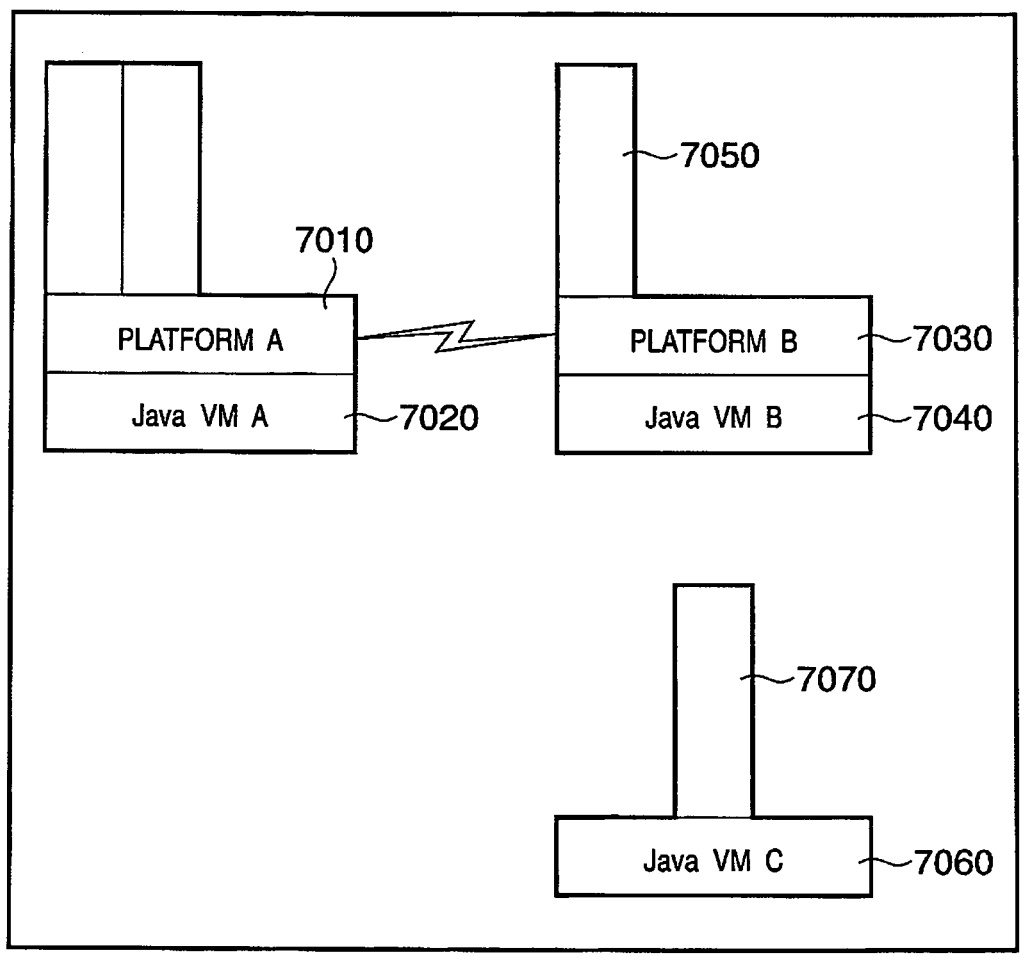
FIG. 7 depicts a view explaining interactive operation to be performed in this embodiment.

FIG. 7 depicts a view of interactive operation to be performed in this embodiment.

In the figure, a platform A 7010 is assumed to be the platform which has received the installation instruction in the above-described installation processing. Reference numeral 7020 denotes a Java VM A (a Java virtual machine A) for executing the platform A 7010. A platform B 7030 is a platform generated by the specified platform A 7010 for interactive operation in the case where "Interactive", which indicates that interactive operation is required, is specified as the "NeedProcess" attribute value of a bundle on the platform A 7010. Reference numeral 7040 denotes a Java VM B (a Java virtual machine B) for executing the platform B 7030. Though a bundle 7050 is installed on the platform A 7010, it is executed on a different process and specified to coordinate with the platform A 7010 during execution.

A bundle 7070 is executed as a process different from a process for the platform A 7010, and is specified and installed as a bundle which is not required to coordinate with the platform A 7010 during execution. Reference numeral 7060 denotes a Java VM C (a Java virtual machine C) for executing the bundle 7070.

In such a case, at step S13 described above, the bundle 7050 is executed as a process different from a process for bundles on the platform A 7010 and is recognized as being required to perform interactive operation with the platform A 7010.

In this case, if an execution environment to be used by the platform B 7030 has not been constructed yet, then the execution environment is constructed. In the constructed execution environment, the bundle identifier 5010 of the bundle 7050 is stored in the platform A 7010 in a manner that it is referred to as a key.

Furthermore, in order to reproduce the status of the platform B 7030 shown when the platform B 7030 was stopped, in the case of re-activating the platform B 7030, information indicating what bundles are installed and the status of each bundle at the time when the platform B 7030 stopped is stored. By copying only the information stored for re-activation and newly creating other information, the execution environment of the platform B 7030 can be created. Then, the copied information for re-activation is changed, and while only information about the bundle 7050 is left, all information about other bundles is deleted. That is, information for causing only the bundle 7050 to be installed and executed is generated. With the use of the information, the platform B 7030, which is a separate platform from the viewpoint of the platform A 7010, is activated together with the Java VM B 7040. Thereby, the separate platform B 7030 in which only the bundle 7050 is installed and implemented is activated.

In OSGi, an interface used in accessing to a platform from a bundle is defined as "BundleContext", and an interface used in accessing to a bundle from another bundle or a platform is defined as "Bundle".

The interaction between the platform A 7010 and the platform B 7030 is performed via an interface which has been changed based on the two interfaces so that RMI (Remote Method Invocation), a technique for communication between Java processes, can be used. Thereby, the bundle 7050 executed on the platform B 7030 is managed as if it were executed on the platform A 7010.

In the specifications of OSGi, there is further defined a service function for providing a part of functions of a bundle to other bundles. This service function defines an interface for the service as an interface for Java, and a service object implemented with the Java interface is registered with the registry. Furthermore, this service function searches in the registry with the Java interface as a key to receive a service object and utilizes the service.

In this embodiment, a service provided by a bundle executed on a different process or a service utilized by a bundle executed on a different process performs communication between processes. Accordingly, a restriction is placed that only interfaces are targeted with which a Remote interface is implemented and which are defined so that all methods are capable of causing RemoteException.

As the process identifier 5050 of the bundle management object, an identifier identifying the process of the activated platform B 7030 is set.

In FIG. 7, the bundle 7070 is determined to be executed on a different process at step S12 in FIG. 6 but is determined at step S13 not to be required to interact with the platform A 7010. In the case of activating the bundle 7070, a class path used for activating the platform A 7010 which is added with a Jar file constituting the bundle 7070 is assumed to be the class path. Then, a class specified as the "Bundle-Activator" attribute is acquired from the attribute list 5040 of the bundle management object. Then, by specifying the acquired class as an entry class and activating the Java VM C 7060, the bundle 7070 is activated. In this case, in the class specified as "Bundle-Activator", a method having the following signature must be defined.

public static void main(String [ ] args)

In this embodiment, the bundle 7070 is assumed to be written in the Java language. However, it may not be written in the Java language only if it is in a format which can be executed by the operating system 2010. In this case, a Jar file often cannot be used as an executable bundle file, but it is possible to include an executable file in a Jar file installed as a bundle, and take the executable file out of the Jar file and execute it at execution.

The generated process identifier is set as the process identifier 5050 of the bundle management object.

A bundle installed on a platform can be activated as described above.

Next, processing to be performed when a bundle is stopped will be described.

Figure 8:
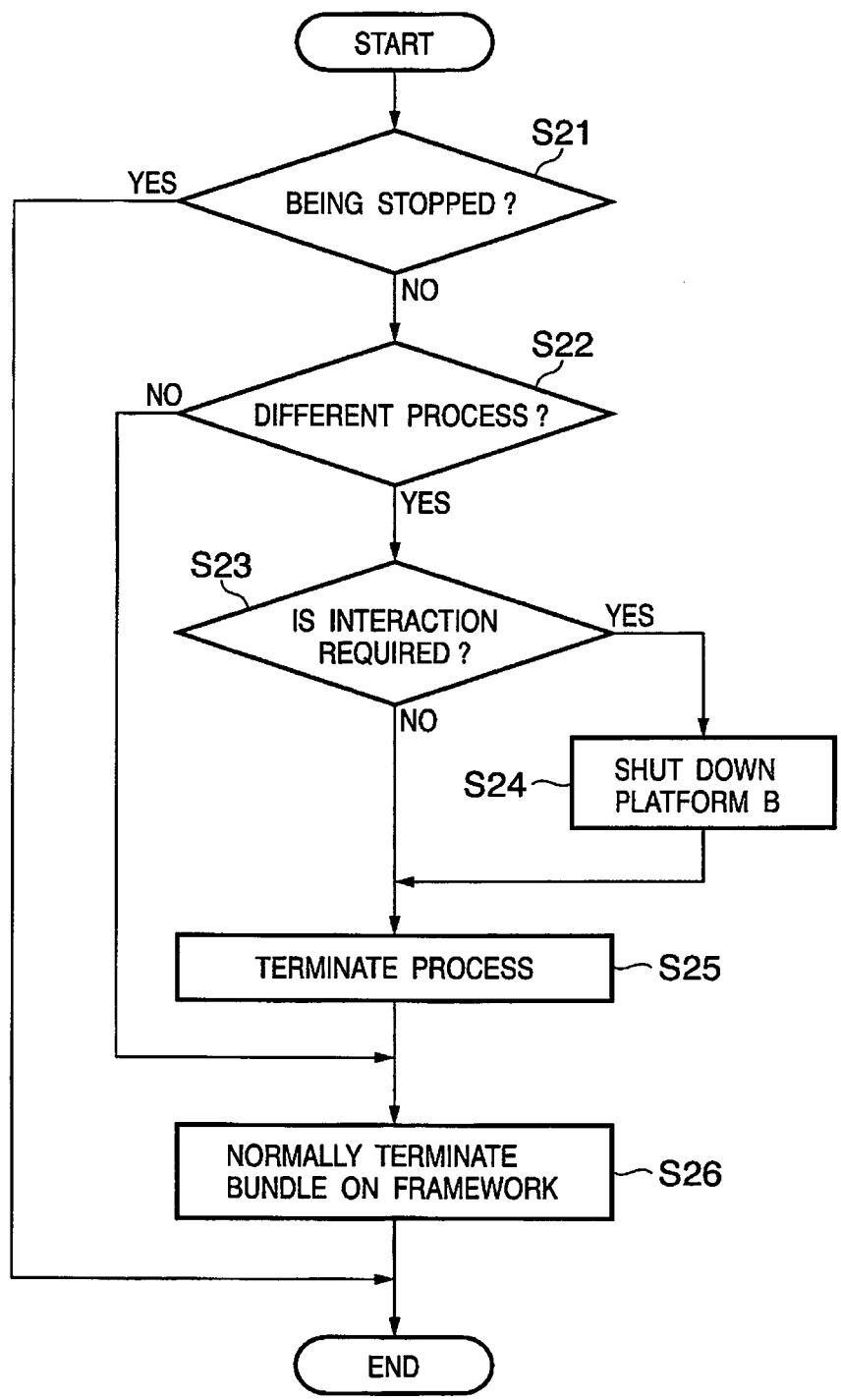
FIG. 8 is a flowchart illustrating bundle stop processing according to this embodiment.

FIG. 8 is a flowchart illustrating bundle stop processing according to this embodiment.

First, at step S21, it is determined whether the status 5030 of the bundle management object is "ACTIVE" (during execution). If it is not "ACTIVE", then it is assumed that the bundle management object has already stopped, and the processing is terminated. If it is "ACTIVE", then the procedure proceeds to step S22, where it is determined whether the "NeedProcess" attribute is set in the attribute list 5040 of the bundle management object. If the "NeedProcess" attribute is set, then the procedure proceeds to step S23, and otherwise, the procedure proceeds to step S26.

At step S26, since the bundle to be stopped is a bundle 2040 (FIG. 2) on the normal platform 2020, stop processing for a bundle on the platform 2020 is performed. When this stop processing ends, the status value "INSTALLED", which indicates that the bundle is being stopped, is set in the status field 5030 of the bundle management object. After that, the processing is terminated.

Meanwhile, at step S23, the platform which has received a stop instruction checks the "NeedProcess" attribute value obtained at step S22 to determine whether interactive operation between the bundle being executed and the platform is required. If the interactive operation is required, then the procedure proceeds to step S24, and otherwise, the procedure proceeds to step S25. At step S24, the platform which has received the stop instruction (in the example of FIG. 7, the platform A 7010) identifies a platform on which a specified bundle has been activated (in the example of FIG. 7, the platform B 7030) by the process identifier 5050 of the bundle management object. Then, it instructs the identified platform to perform platform shutdown processing. In this platform shutdown processing, the status of the bundle operating on the platform is stored in the secondary storage 1030 so that the status can be restored at the time of re-activation, the platform is stopped, and then the procedure proceeds to step S25. At step S25, a process identifier described as the process identifier 5050 of the bundle management object is used to request the operating system 2010 to terminate the process identified by the process identifier. Then, the procedure proceeds to step S26, where the stop processing for the bundle on the platform 2020 is performed. The bundle stop processing is performed as described above.

Lastly, description will be made on processing to be performed when a bundle is uninstalled.

Figure 9:
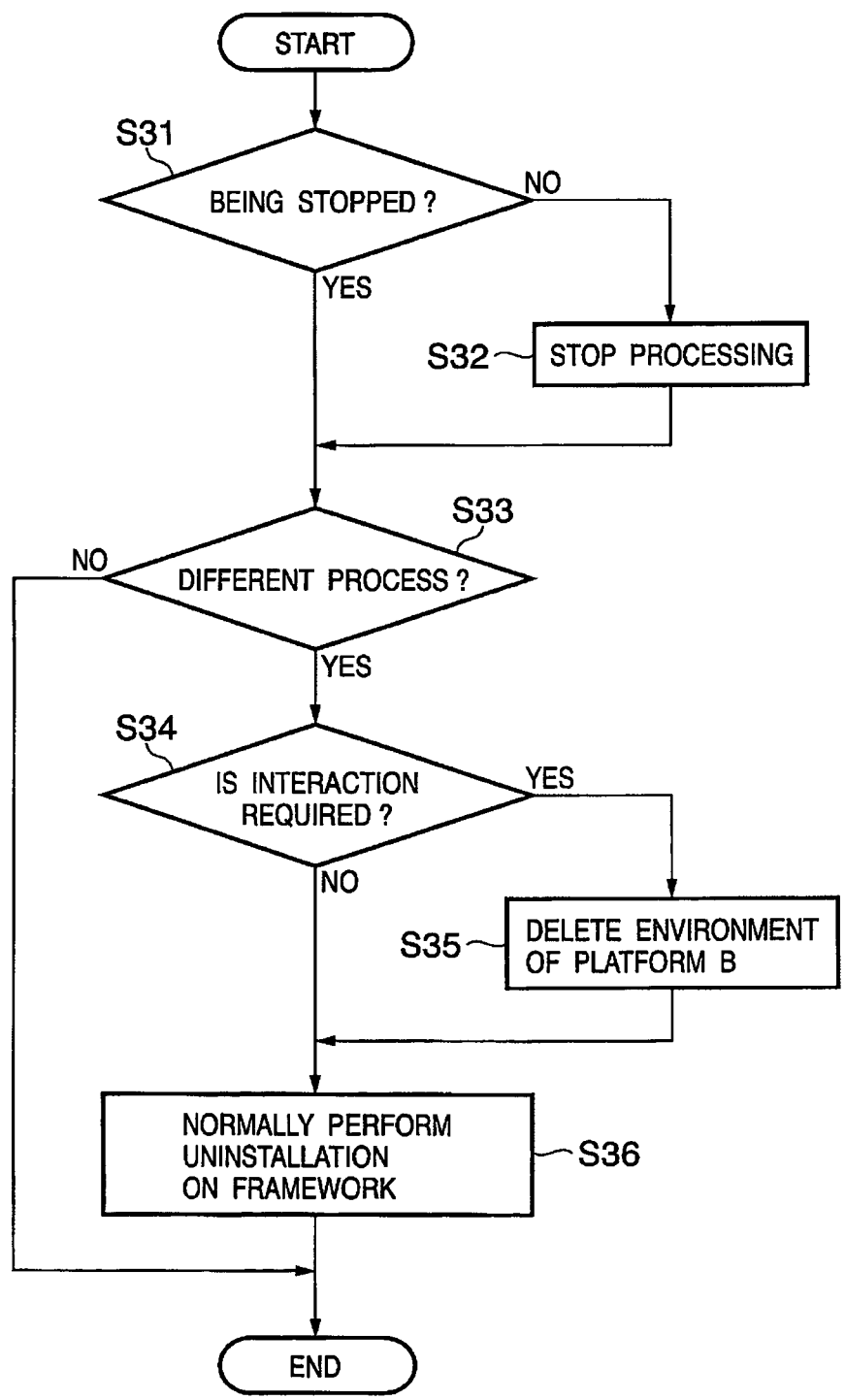
FIG. 9 is a flowchart illustrating processing to be performed when a bundle is uninstalled, according to a first embodiment of the present invention.

FIG. 9 is a flowchart illustrating processing to be performed when a bundle is uninstalled.

First, at step S31, it is determined whether a specified bundle has been stopped by checking whether the status 5030 of the bundle management object is "ACTIVE". If the status set for the status 5030 is not "ACTIVE", then it is determined that the bundle has been stopped, and the procedure proceeds to step S33. However, if the bundle is being executed, then the procedure proceeds to step S32, where the bundle stop processing described with reference to FIG. 8 is performed, and then the procedure proceeds to step S33.

At step S33, it is determined whether the "NeedProcess" attribute is set in the attribute list 5040 of the bundle management object. If the "NeedProcess" attribute is set, then the procedure proceeds to step S34. Otherwise, the procedure proceeds to step S36. At step 34, the platform which has received an uninstallation instruction checks the "NeedProcess" attribute value obtained at step S33 to determine whether interactive operation between the specified bundle and the platform is required. If the interactive operation is required, then the procedure proceeds to step S35. Otherwise, the procedure proceeds to step S36. At step S35, the execution environment for a platform generated at the time of activation (in the example of FIG. 7, the platform B 7030) is deleted, and the procedure proceeds to step S36, where normal uninstallation processing for a bundle is performed on the platform which has received the uninstallation instruction. In this case, all resources related to the bundle such as files generated at the time of installation are deleted. The bundle uninstallation processing is performed as described above.

Thus, it is possible to cause a bundle to be executed on a different process when execution on a different process is specified as an attribute of the bundle and perform management by means of an extensible application.

Second Embodiment

Next, a second embodiment of the present invention will be described.

This embodiment shows a method which enables management of an application on a platform even if the application is not installed on the platform but is installed directly on the operating system 2010 as an executable application. The configuration of computer equipment, the configuration of software, the data format, and the like are the same as the first embodiment described above, and therefore, description thereof will be omitted.

FIG. 10 is a flowchart illustrating installation processing according to the second embodiment of the present invention, and the program for performing this processing is stored in the primary storage 1020 and executed under the control of the controller 1010.

First, at step S41, it is determined whether a bundle installed from the same location where a file specified to be installed is stored exists. If it exists, then the processing is terminated. Otherwise, the procedure proceeds to step S42, where data to be installed is decrypted. The encryption key used for decryption is stored in the platform. Next, at step S43, it is determined a storage location where the file specified to be installed is stored. Since the storage location is specified by a URL, it is possible to determine whether or not the storage location is at an apparatus connected via a network by checking host information about the URL. Data of a bundle to be installed may be handed over not as a file name but as stream data in some cases. In such cases, it is recognized that the data does not exist within the same apparatus. If it is determined at step S43 that the data exists in the same apparatus, then the procedure proceeds to step S44. Otherwise, the procedure proceeds to step S45.

At step S44, it is determined whether the specified file is a bundle file. Herein, if the file is a ZIP file, a manifest file entry exists, and a bundle-specific manifest header exists, then the file is recognized to be a bundle file. Then, if it is determined that the file is a bundle file, the procedure proceeds to step S45. Otherwise, the procedure proceeds to step S48.

At step S45, the decrypted bundle file is stored in a directory in which a platform received an installation instruction stores a bundle file for bundle management. Next, at step S46, a bundle management object is generated as a normal bundle.

In this case, the status 5030 is set as "INSTALLED". The procedure then proceeds to step S47.

On the other hand, if the file is not a bundle file at step S44, then the procedure proceeds to step S48, where the "Need-Process" attribute is set in the attribute list 5040 of the bundle management object so that it has "Native", which indicates that the bundle can be executed on the operating system 2010, as an attribute value. Thereby, the targeted bundle is executed on a different process not in interaction with the platform which has received the installation instruction. The process then proceeds to step S47. At step S47, the platform which has received the installation instruction creates a bundle object from the bundle management object created at step S46 or step S48, and stores it so that it can be used for bundle management. The activation processing, the termination processing and the uninstallation of the bundle processing are equivalent to those in the first embodiment described above.

Thus, it is possible to manage an application installed for the operating system 2010, on the framework A 7010.

The embodiments of the present invention have been described in detail. The present invention may be applied to a system configured by multiple pieces of equipment or may be applied to an apparatus configured by one piece of equipment.

There is included a case where the present invention is achieved by directly or remotely supplying software programs for realizing the functions of the above-described embodiments to a system or an apparatus, and by the computer of the system or the apparatus reading and executing the supplied program codes. In this case, the form is not limited to a program only if the functions of a program are provided. Accordingly, the program codes themselves, which are to be installed in a computer to realize the functions and processings of the present invention by the computer, also realize the present invention. That is, the present invention includes the computer programs themselves for realizing the functions and processings of the present invention. In this case, any program form, such as an object code, a program to be executed by an interpreter and script data to be supplied to an OS, may be possible only if the functions of a program are provided.

As a storage medium for supplying the programs, there are, for example, a Floppy® disk, hard disk, optical disk, magneto-optical disk, MO, CD-ROM, CD-R, CD-RW, magnetic tape, non-volatile memory card, ROM, DVD (DVD-ROM and DVD-R) and the like. In addition, as another method for supplying the programs, it is also possible to supply the programs by connecting to an Internet web page with the use of a browser of a client computer and downloading the computer programs of the present invention or a compressed file including an automatic installation function from the web page to a storage medium such as a hard disk. It is also possible to divide the program codes constituting the programs of the present invention into multiple files so that each file may be downloaded from a different web page. That is, a WWW server enabling multiple users to download a program file for realizing the functions and processings of the present invention is also included in the claims of the present invention.

Furthermore, it is also possible to encrypt the programs of the present invention, store them in a storage medium such as a CD-ROM and distribute the CD-ROM to users in order to enable a user who satisfies predetermined conditions to download key information for decryption from a web page via the Internet, use the key information to execute the encrypted programs, install them on a computer and realize them.

Furthermore, in addition to the case where the functions of the embodiment described above are realized by a computer executing the read programs, the functions of the embodiment described above can be also realized by an OS or the like, which is operating on the computer, performing a part or all of the actual processing based on instructions of the programs.

Furthermore, the functions of the embodiment described above can be also realized by the CPU or the like, which is provided for a feature expansion board inserted in a computer or a feature expansion unit connected to the computer, performing a part or all of the actual processing based on instructions of the programs, which have been read from a recording medium and written in the memory provided for the feature expansion board or the feature expansion unit.

Though the present invention has been described based on the preferred embodiments, the present invention is not limited to the embodiments, and various variations are possible within the range of the claims.

CLAIM OF PRIORITY

This application claims priority from Japanese Patent Application No. 2004-354696 filed on Dec. 7, 2004, which is hereby incorporated by reference herein.

What is claimed is:

1. A management method performed by a first platform of a first process in a system in which each of platforms is formed in a different process, and the first platform is managing software modules that are installed into the first platform, comprising the steps of:

reading out an attribute of a software module included in the software modules installed into the first platform, from the software module;

referring to the attribute of the software module read out in the reading step, upon activating the software module that provides another software module with a service, wherein the first platform is executed by a first virtual machine;

forming a second platform of a second process for activating the software module that has not been activated and activating the software module on the second platform of the second process, in a case where the attribute referred in the referring step includes a different process formation attribute indicating that the software module is to be executed on a platform of a process different from the first process of the first platform in which the software module is installed, wherein the second platform is executed by a second virtual machine different from the first virtual machine; and activating the software module on the first platform in a case where the attribute referred in the referring step does not include the different process formation attribute.

2. The method according to claim 1, further comprising a step of setting the attribute of the software module in a case where the software module is installed.

3. The method according to claim 1, wherein the first platform of the first process on which the software module has been installed is caused to interact with the software module to be activated on the second platform of the second process, in a case where the attribute referred in the referring step includes an inter-process interaction attribute indicating that the first platform of the first process on which the software module has been installed and the software module to be executed on the second platform of the second process are to interact with each other.

4. The method according to claim 1, further comprising a step of assigning an attribute as a software module to be executed on a different process to an application to be installed on a platform different from the first platform for managing software modules, wherein the application to which the attribute is assigned is a subject to be managed as a software module on the first platform for managing the software modules.

5. The method according to claim 1, further comprising a step of determining whether or not the software module to be activated has been activated, and wherein the second platform of the second process is formed for activating the software module and the software module on the second platform of the second process is activated, in a case where the software to be activated has not been activated and the attribute referred in the referring step includes the different process formation attribute.

6. An information processor for forming a first platform of a first process in a system in which each of platforms is formed in a different process and the first platform is managing software modules that are installed into the first platform, comprising:

reading out an attribute of a software module included in the software modules installed into the first platform, from the software module;

reference means for referring to the attribute of the software module read out by the reading means, upon activating the software module that provides another software with a service, wherein the first platform is executed by a first virtual machine; and activation means for forming a second platform of a second process for:

activating the software module that has not been activated and activating the software module on the second platform of the second process, in a case where the attribute referred by the reference means include a different process formation attribute indicating that the software module is to be executed on a platform of a process different from the first process of the first platform in which the software module is installed, wherein the second platform is executed by a second virtual machine different from the first virtual machine, and activating the software module on the first platform in a case where the attribute referred in the referring step does not include the different process formation attribute.

7. The information processor according to claim 6, further comprising setting means for setting the attribute of the software module in a case where the software module is installed.

8. The information processor according to claim 6, wherein said activation means cause the first platform of the first process on which the software module has been installed to interact with the software module to be activated on the second platform of the second process, in a case where the attribute referred by the reference means include an inter-process interaction attribute indicating that the first platform of the first process on which the software module has been installed and the software module to be executed on the second platform of the second process are to interact with each other.

9. The information processor according to claim 6, further comprising assignment means for assigning an attribute as a software module to be executed on a different process to an application to be installed on a platform different from the first platform for managing software modules, wherein the application to which the attribute is assigned is a subject to be managed as a software module on the first platform for managing the software modules.

10. The information processor according to claim 6, wherein said activation means determines whether or not the software module to be activated has been activated, and forms the second platform of the second process for activating the software module and activates the software module on the second platform of the second process, in a case where the software to be activated has not been activated and the attribute referred in the referring step includes the different process formation attribute.

11. A non-transitory storage medium in which a management program performed in a first platform of a first process in a system in which each of platforms is formed in a different process and the management program is managing software modules that are installed into the first platform generated in each process, the management program comprising the steps of:

reading out an attribute of a software module included in the software modules installed into the first platform, from the software module;

referring to the attribute of the software module read out in the reading step, when activating the software module that provides another software with a service, wherein the first platform is executed by a first virtual machine;

forming a second platform of a second process for activating the software module that has not been activated and activating the software module on the second platform of the second process, in a case where the attribute referred in the reference step include a different process formation attribute indicating that the software module is to be executed on a platform of a process different from the first process of the first platform in which the software module is installed, wherein the second platform is executed by a second virtual machine different from the first virtual machine; and activating the software module on the first platform in a case where the attribute referred in the referring step does not include the different process formation attribute.

12. The storage medium according to claim 11, wherein the management program further comprises a step of setting the attribute of the software module in a case where the software module is installed.

13. The storage medium according to claim 11, wherein the first platform of the first process on which the software module has been installed is caused to interact with the software module to be activated on the second platform of the second process, in a case where the attribute referred in the reference step include an inter-process interaction attribute indicating that the first platform of the first process on which the software module has been installed and the software module to be executed on the second platform of the second process are to interact with each other.

14. The storage medium according to claim 11, wherein the management program further comprises a step of assigning an attribute as a software module to be executed on a different process to an application to be installed on a platform different from the first platform for managing software modules, wherein the application to which the attribute is assigned is a subject to be managed as a software module on the first platform for managing the software modules.

15. The storage medium according to claim 11, further comprising a step of determining whether or not the software module to be activated has been activated, and wherein the second platform of the second process is formed for activating the software module and the software module on the second platform of the second process is activated, in a case where the software to be activated has not been activated and the attribute referred in the referring step includes the different process formation attribute.

* * * * *